United States Patent
Kiib et al.

(10) Patent No.: US 12,281,639 B2
(45) Date of Patent: Apr. 22, 2025

(54) DETERMINING WIND TURBINE ROTOR SPEED

(71) Applicant: VESTAS WIND SYSTEMS A/S, Aarhus N (DK)

(72) Inventors: Kristian Kiib, Skødstrup (DK); Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/557,872

(22) PCT Filed: Apr. 26, 2022

(86) PCT No.: PCT/DK2022/050084
§ 371 (c)(1),
(2) Date: Oct. 27, 2023

(87) PCT Pub. No.: WO2022/228630
PCT Pub. Date: Nov. 3, 2022

(65) Prior Publication Data
US 2024/0240613 A1  Jul. 18, 2024

(30) Foreign Application Priority Data
Apr. 27, 2021 (DK) .......................... PA 2021 70190

(51) Int. Cl.
F03D 7/04 (2006.01)

(52) U.S. Cl.
CPC ........ *F03D 7/042* (2013.01); *F05B 2260/821* (2013.01); *F05B 2270/327* (2013.01)

(58) Field of Classification Search
CPC .................. F03D 7/042; F03D 17/007; F03D 17/009–0285; F05B 2270/327; F05B 2270/807
See application file for complete search history.

(56) References Cited

U.S. PATENT DOCUMENTS 8,092,174 B2 * 1/2012 Egedal ...................... G01P 3/16
416/61
8,246,304 B2 * 8/2012 Egedal .................... G01P 21/02
416/61
(Continued)

FOREIGN PATENT DOCUMENTS

CN 110159494 A 8/2019
KR 101375268 B1 3/2014

OTHER PUBLICATIONS

PCT, Notification of Transmittal of The International Search Report and the Written Opinion of the International Searching Authority, or the Declaration for Application PCT/DK2022/050084 dated Jul. 19, 2022.
(Continued)

*Primary Examiner* — Christopher R Legendre
(74) *Attorney, Agent, or Firm* — Patterson + Sheridan, LLP (57) ABSTRACT

A method of determining rotor speed of a wind turbine. The method involves receiving angular velocity sensor data indicative of an angular velocity of the wind turbine rotor hub, provided e.g., by a gyroscope and receiving acceleration sensor data indicative of an acceleration of the rotor hub in at least one radial direction relative to an axis of rotation of the rotor hub. The method further involves determining first and second estimated rotational speeds of the rotor hub based on the respective angular velocity sensor data and acceleration sensor data. The method also involves determining a correction value based on a difference between the first and second estimated rotational speeds, and applying the correction value to the first estimated rotational speed to determine the true current rotor speed of the wind turbine.

19 Claims, 7 Drawing Sheets

(56) References Cited

U.S. PATENT DOCUMENTS

| | | |
|---|---|---|
| 2010/0133828 A1 | 6/2010 | Stegemann et al. |
| 2010/0135800 A1 | 6/2010 | Melius |
| 2012/0042727 A1 | 2/2012 | Egedal |
| 2014/0316708 A1 | 10/2014 | Mollineaux et al. |
| 2019/0048854 A1 | 2/2019 | Oshetski et al. |
| 2024/0240613 A1* | 7/2024 | Kiib ........................ F03D 7/042 |

OTHER PUBLICATIONS

Danish Patent and Trademark Office, 1st Technical Examination including the Search Report and Search Opinion for Application PA 2021 70190 dated Nov. 12, 2021.

* cited by examiner

DETERMINING WIND TURBINE ROTOR SPEED

TECHNICAL FIELD

The invention relates to determining rotor speed of a wind turbine. In particular, the determination of rotor speed involves correcting an estimated rotational speed of the wind turbine rotor hub determined based on a rotor hub angular velocity measurement using an estimated rotational speed of the rotor hub based on a rotor hub acceleration measurement.

BACKGROUND OF THE INVENTION

It is important to be able to obtain accurate measurements of rotational speeds of various components of a wind turbine, for instance rotor speed, generator speed, etc. This allows for monitoring to ensure that a wind turbine is operating as controlled or expected, and allows determinations relating to power generation of the wind turbine to be performed.

A wind turbine may need separate measurements of component rotational speeds in a control domain and a safety domain of the wind turbine. In particular, measurements in the control domain may be used to control the wind turbine to maximise power generating efficiency and reduce loading on turbine components. On the other hand, measurements in the safety domain may be used to determine when a safety controller of wind turbine needs to assume control of the turbine, e.g. to shut down the turbine.

A wind turbine may use a number of separate methods to determine rotational speeds of components. One method for measuring wind turbine rotor speed—that can be used in the safety domain—can involve measuring period times in pulse train signals from two different speed sensors in the wind turbine nacelle and then comparing the different measurements. However, this method can be sensitive to noise, particularly at low rotor speeds, and the required equipment can also be expensive.

Another method for measuring rotor speed that can be used in the safety domain involves using a gyroscope located in the wind turbine rotor hub. However, for the measurement to be suitable for use in the safety domain the gyroscope measurement may need to be verified against measurements—e.g. control domain measurements—performed in the nacelle, for instance nacelle-based rotor speed and/or generator speed measurements. In a case in which communication between the rotor hub and the nacelle fails, then the hub-based measurement cannot be verified. A further disadvantage of such a hub-based rotor speed measurement is that there may exist DC offset and drift in the gyroscope signal, thereby reducing measurement accuracy.

It is against this background to which the present invention is set.

SUMMARY OF THE INVENTION

According to an aspect of the invention there is provided a method of determining rotor speed of a wind turbine The method comprises receiving angular velocity sensor data, from an angular velocity sensor located in a rotor hub of the wind turbine, indicative of an angular velocity of the rotor hub. The method comprises receiving acceleration sensor data, from an acceleration sensor located in the rotor hub, indicative of an acceleration of the rotor hub in at least one radial direction relative to an axis of rotation of the rotor hub. The method comprises determining a first estimated rotational speed of the rotor hub based on the received angular velocity sensor data. The method comprises determining a second estimated rotational speed of the rotor hub based on the received acceleration sensor data. The method comprises determining a correction value based on a difference between the first and second estimated rotational speeds. The method comprises applying the correction value to the first estimated rotational speed to determine rotor speed of the wind turbine.

Determining the first and second estimated rotational speeds may comprise transforming the received angular velocity sensor data and the received acceleration sensor data into a rotational coordinate system that rotates with the rotor hub.

The method may comprise retrieving a rotor speed determined at a previous timestep. Determining the second estimated rotor speed may comprise applying an offset to the acceleration of the rotor hub in the at least one radial direction to compensate for a centripetal force contribution included in the received acceleration data. The offset may be determined based on the determined rotor speed from the previous timestep.

The acceleration of the rotor hub in the at least one radial direction perpendicular to the axis of rotation of the rotor hub may be a substantially sinusoidal signal. The second estimated rotor speed may be determined based on a determined period of the one or more sinusoidal signals.

Determining the second estimated rotor speed may comprise converting the one or more sinusoidal signals to respective logic signals, and basing the determination of estimated rotor speed on a determined period of the one or more logic signals.

Converting to one or more logic signals may comprise assigning a true value when the respective sinusoidal signal moves above a first threshold value and assigning a false value when the respective sinusoidal signal moves below a second threshold value. Optionally, the first threshold value may be +0.5 g. Optionally, the second threshold value may be −0.5 g.

Determining the first and second estimated rotor speeds may comprise determining representative values of each of the first and second estimated rotor speeds over a time interval. Optionally, the representative values may be mean values. Further optionally, the time interval may correspond to a time taken for the rotor hub to complete a prescribed number of full rotations. Further optionally, the correction value may be determined as a difference between the respective representative values.

Determining the correction value may comprise determining a representative value of the correction value over a time interval. Applying the correction value may comprise applying the representative value of the correction value to the first estimated rotational speed to determine rotor speed of the wind turbine. Optionally, the representative value may be a mean value. Further optionally, the time interval may correspond to a time taken for the rotor hub to complete a prescribed number of full rotations.

The received acceleration sensor data may include data indicative of an acceleration of the rotor hub in two different radial directions relative to the axis of rotation of the rotor hub. The two different radial directions may be perpendicular to each another.

The correction value may be determined at a prescribed trigger point. Optionally, the trigger may be upon each completed full rotation of the rotor hub.

The method may comprise generating an error signal if the determined correction value is greater than a prescribed threshold correction value.

The angular velocity sensor and the acceleration sensor may be part of a single sensor unit located in the rotor hub. Optionally, the angular velocity sensor may be a multi-axis gyroscope and/or the acceleration sensor may be an accelerometer.

The angular velocity sensor and the acceleration sensor may be embedded in a safety control system of the rotor hub.

According to another aspect of the invention there is provided a non-transitory, computer-readable storage medium storing instructions thereon that when executed by one or more processors cause the one or more processor to perform a method as described above.

According to another aspect of the invention there is provided a control system for a wind turbine. The system comprises an angular velocity sensor and an acceleration sensor each located in a rotor hub of the wind turbine. The system comprises a computer processor configured to: receive angular velocity sensor data, from the angular velocity sensor, indicative of an angular velocity of the rotor hub; receive acceleration sensor data, from the acceleration sensor, indicative of an acceleration of the rotor hub in at least one radial direction relative to an axis of rotation of the rotor hub; determine a first estimated rotational speed of the rotor hub based on the received angular velocity sensor data; determine a second estimated rotational speed of the rotor hub based on the received acceleration sensor data; determine a correction value based on a difference between the first and second estimated rotational speeds; and, apply the correction value to the first estimated rotational speed to determine rotor speed of the wind turbine.

The control system may be a safety control system of the wind turbine.

According to another aspect of the invention there is provided a wind turbine comprising a control system as described above.

BRIEF DESCRIPTION OF THE DRAWINGS

Examples of the invention will now be described with reference to the accompanying drawings, in which:

FIG. 7(b) shows a plot indicative of a compensation value based on a difference between the estimated rotor speeds of FIG. 7(a).

DETAILED DESCRIPTION OF EMBODIMENTS

Figure 1:
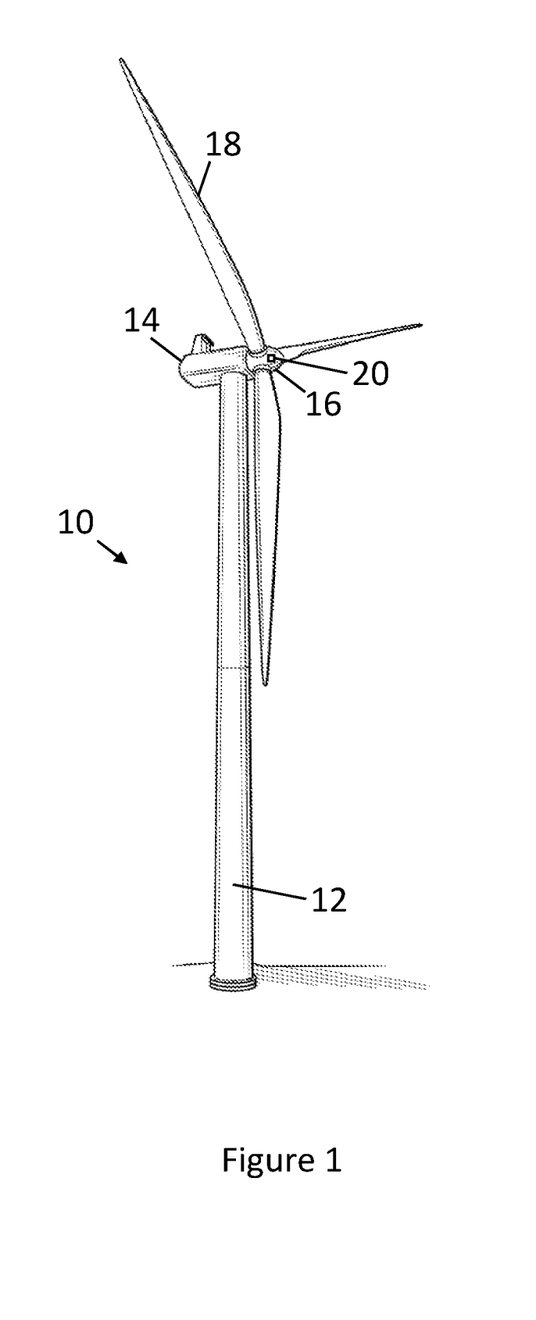
FIG. 1 is a schematic view of a wind turbine including a control system according to an example of the invention.

FIG. 1 shows a wind turbine 10 including a tower 12, a nacelle 14 rotatably coupled to the top of the tower 12, a rotor including a rotor hub 16 mounted to the nacelle 14, and a plurality of wind turbine rotor blades 18—in the described example, three rotor blades—which are coupled to the rotor hub 16. The nacelle 14 and rotor blades 18 are turned and directed into the wind direction by a yaw system. The nacelle 14 houses generating components (not shown) of the wind turbine 10, including a generator, gearbox assembly (gear assembly or, simply, gearbox), drivetrain and brake assembly, as well as convertor equipment for converting the kinetic energy of the wind into electrical energy for provision to the grid. The wind turbine 10 is shown in its fully-installed form suitable for operation; in particular, the rotor hub 16 is mounted on the nacelle 14 and each of the blades 18 are mounted on the rotor hub 16.

The wind turbine 10 includes a control system 20 located in the rotor hub 16. In the described example, the control system 20 is in a safety domain of the wind turbine 10 such that it is a safety control system. It will be understood, however, that the methods described in the following may alternatively be performed by a control system that is part of a control domain of the wind turbine.

Figure 2:
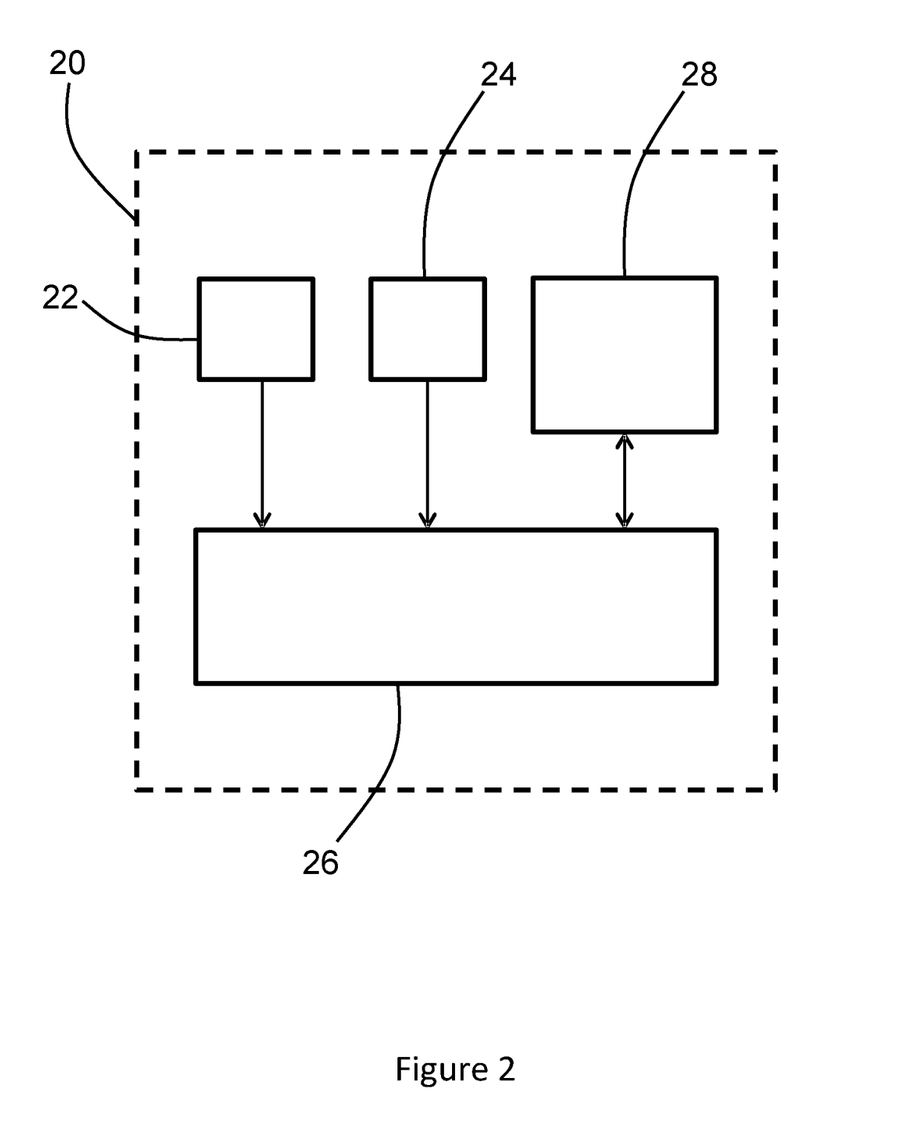
FIG. 2 is a schematic view of component parts of the control system of FIG. 1.

FIG. 2 illustrates different components of the control system 20. The system 20 includes a gyroscope 22 for measuring angular velocity of the rotor hub 16, and an accelerometer 24 for measuring acceleration of the rotor hub 16. The gyroscope 22 and accelerometer 24 may be part of a single measurement unit mounted in the rotor hub 16. The rotational motion of the rotor hub 16 excites the axis of the gyroscope 22 in the measurement unit so that an angular velocity or rate can be measured. In the described example, the accelerometer 24 is a three-axis accelerometer for measuring acceleration in a direction of the rotor hub axis, and in directions perpendicular to the rotor hub axis.

The control system 20 includes a controller 26 (that includes at least one processor) that receives measurements from the angular velocity and acceleration sensors 22, 24. In the described example, the unit including the sensors 22, 24 is embedded with the controller 26 in the control system 20. The controller 26 is for making various determinations based on received signals, including a determination of wind turbine rotor speed based on signals from the angular velocity and acceleration sensors 22, 24, as will be described in greater detail below. The controller 26 may be configured to transmit control signals to control different components of the wind turbine 10, e.g. to control the wind turbine 10 to shut down, if needed.

The control system 20 may further include a memory device 28 for storing instructions, where the processor of the controller 26 accesses the instructions in order to perform the various determinations. The memory device 28 may optionally include a data store for storing historical and/or current measurement values from the sensors 22, 24.

The present invention is advantageous in that it provides a rotor speed measurement that is purely hub-based such that no communication with the wind turbine nacelle is needed, e.g. to verify the measurement. This means that the measurement technique is more resilient to communication breakdowns between the rotor hub and nacelle.

The present invention is also advantageous in that it provides a more reliable and accurate rotor speed measurement that is robust against external noise. Furthermore, the rotor speed measurement is obtained via a relatively simple method that is less complex than some known methods. In addition, existing sensors on the wind turbine may be used, thereby minimising costs, maintenance, and use of space within the wind turbine.

Figure 3:
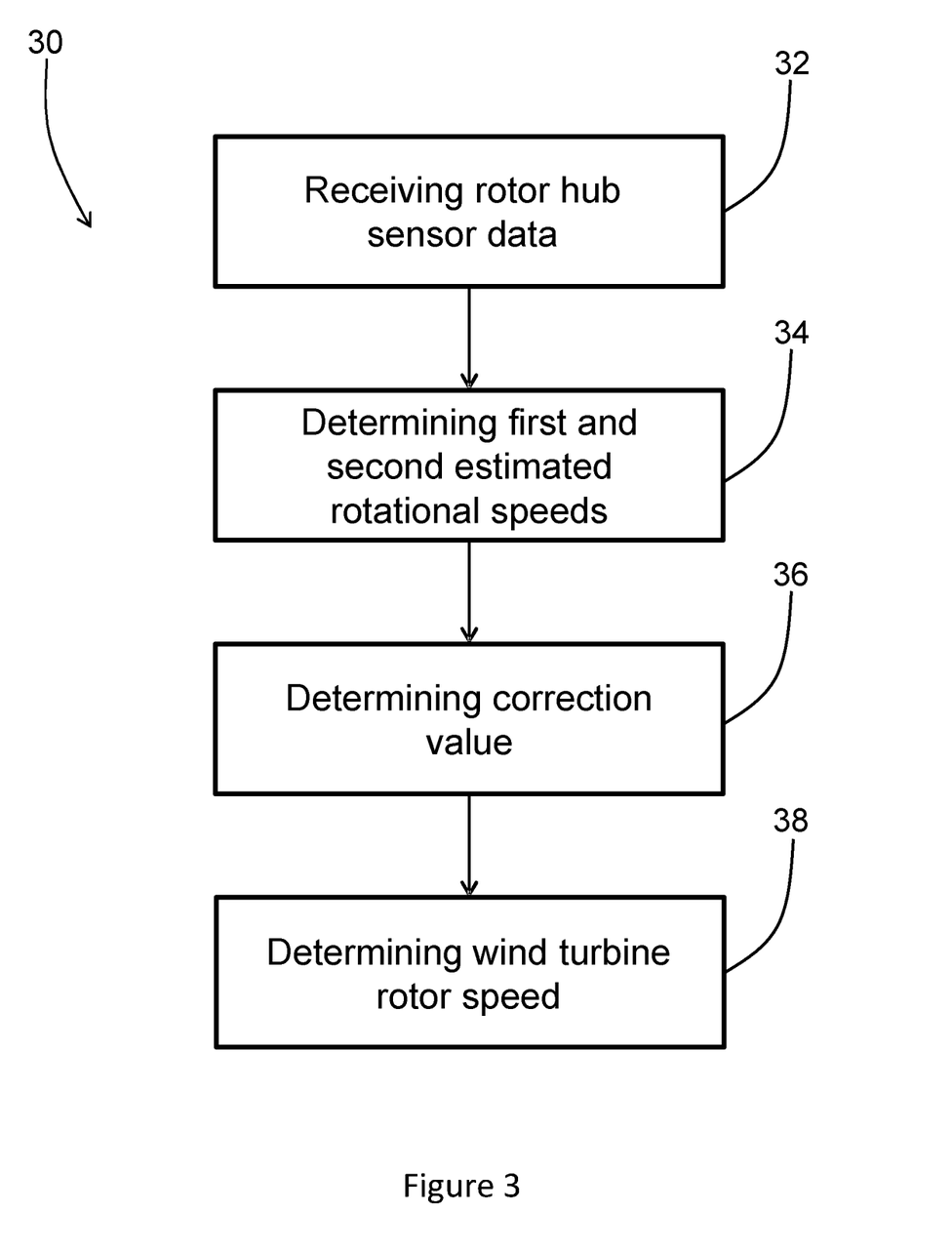
FIG. 3 shows the steps of a method performed by the control system of FIG. 1 in accordance with an example of the invention.

These and further advantages are achieved by using the control system 20 of FIGS. 1 and 2 to perform the method 30 described below with reference to FIG. 3. According to a first step 32 of the method 30 in accordance with the invention, the controller 26 receives sensor signals from the gyroscope 22 and the accelerometer 24.

The gyroscope signal is in the form of angular velocity sensor data that is indicative of an angular velocity or rate of the rotor hub 16. In particular, when the wind turbine 10 is in operation, the rotor hub 16 and rotor blades 18 rotate about an axis of the rotor hub 16. This rotational motion of the hub 16 excites the axis of the gyroscope 22 of the measurement unit located in the rotor hub 16 to generate sensor data indicative of the rotational motion of the hub 16.

The accelerometer signal is in the form of acceleration sensor data indicative of an acceleration of the rotor hub 16 in at least one radial direction relative to the axis of rotation of the rotor hub 16. As mentioned above, in the described example the accelerometer 24 is a three-axis accelerometer. The accelerometer 24 may be oriented in the hub 16 such that it measures acceleration in a direction along the hub axis, and in respective directions radial to the hub axis (and perpendicular to each other). Alternatively, knowledge of the orientation of the accelerometer 24 may be used to extract acceleration measurements in one or more radial directions relative to the hub axis. The present invention uses acceleration measurements along one or more radial directions relative to the hub rotation axis (or perpendicular to the main shaft of the wind turbine 10) to estimate rotational speed. In the described example, acceleration measurements in two mutually perpendicular directions are used to perform this estimation. The accelerometer signal received by the controller 26 therefore includes acceleration data indicative of acceleration in these radial directions.

At step 34 of the method 30, the controller 26 separately determines first and second estimated rotational speeds of the rotor hub 16. The first estimated rotor speed is determined based on the received angular velocity sensor data from the gyroscope 22. The second estimated rotor speed is determined based on the received acceleration sensor data from the accelerometer 24.

Figure 4:
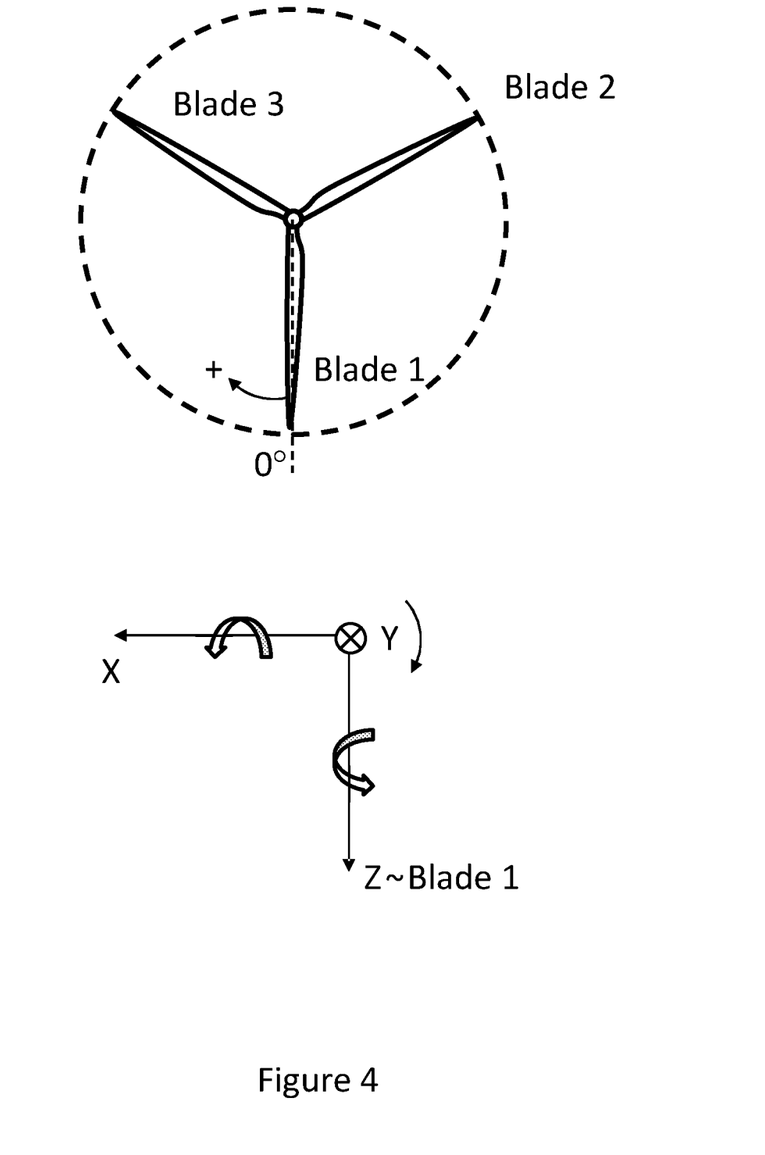
FIG. 4 is a schematic illustration of a rotor front view illustrating a rotational coordinate system used in the method of FIG. 3.

Determining the first and second estimated rotational speeds may include transforming the received angular velocity sensor data and the received acceleration sensor data into a rotational coordinate system that rotates with the rotor hub 16. That is, the received sensor data may be obtained in a local frame of the measurement unit including the sensors, and so the sensor data needs to be rotated into a rotational frame. An example of the rotational coordinate system is shown in FIG. 4, which shows two axes X, Z in a rotational plane of the rotor hub 16 and blades 18, with the third axis Y being along an axis of rotation of the rotor hub 16. The rotated signals may also be passed through a median filter to reduce noise prior to further processing.

The controller 26 uses knowledge of the orientation of the measurement unit—and, in particular, of the gyroscope 22—along with the received gyroscope signal to determine the first estimated rotor speed. This estimated rotor speed based on the gyroscope signal may be regarded as having relatively good dynamic accuracy, i.e. it can account for changes in rotor speed relatively well. However, the estimated rotor speed based on the gyroscope signal may include a temperature dependency and/or drift that reduces the accuracy of this estimation. The accelerometer signal may be used to account for these inaccuracies in the estimated rotor speed so as to improve the accuracy of the determined rotor speed, as described below.

The accelerometer 24 is excited primarily by gravity, but also by centripetal force and rotor rotational speed accelerations and vibrations of the hub 16 and nacelle 14 as the blades 18 rotate during operation of the wind turbine 10. In order to estimate rotor rotational speed from the acceleration signal, the controller 26 needs to process the received acceleration signal to compensate for centripetal force contributions in the measurements. This may readily be implemented as the centripetal force induces an offset proportional to the hub rotor speed in the two accelerometer axes that are perpendicular to the main shaft—i.e. the two radial directions—and so the centripetal force contributions can be identified and removed. In particular, the influence of centripetal acceleration on the received signals may be determined based on the determined rotor speed from a previous timestep and on the position of the sensor in the rotor hub 16. Specifically, an offset—that is determined based on the rotor speed from the previous timestep—may be applied to the received sensor signal in order to compensate for centripetal acceleration. The other contributions (e.g. rotor vibrations) in the acceleration signal that disturb the contribution from gravity are ignored as they do not have a continuous effect on the acceleration signal, and in any case tend to be negligible in terms of magnitude relative to the gravity contribution.

Figure 5:
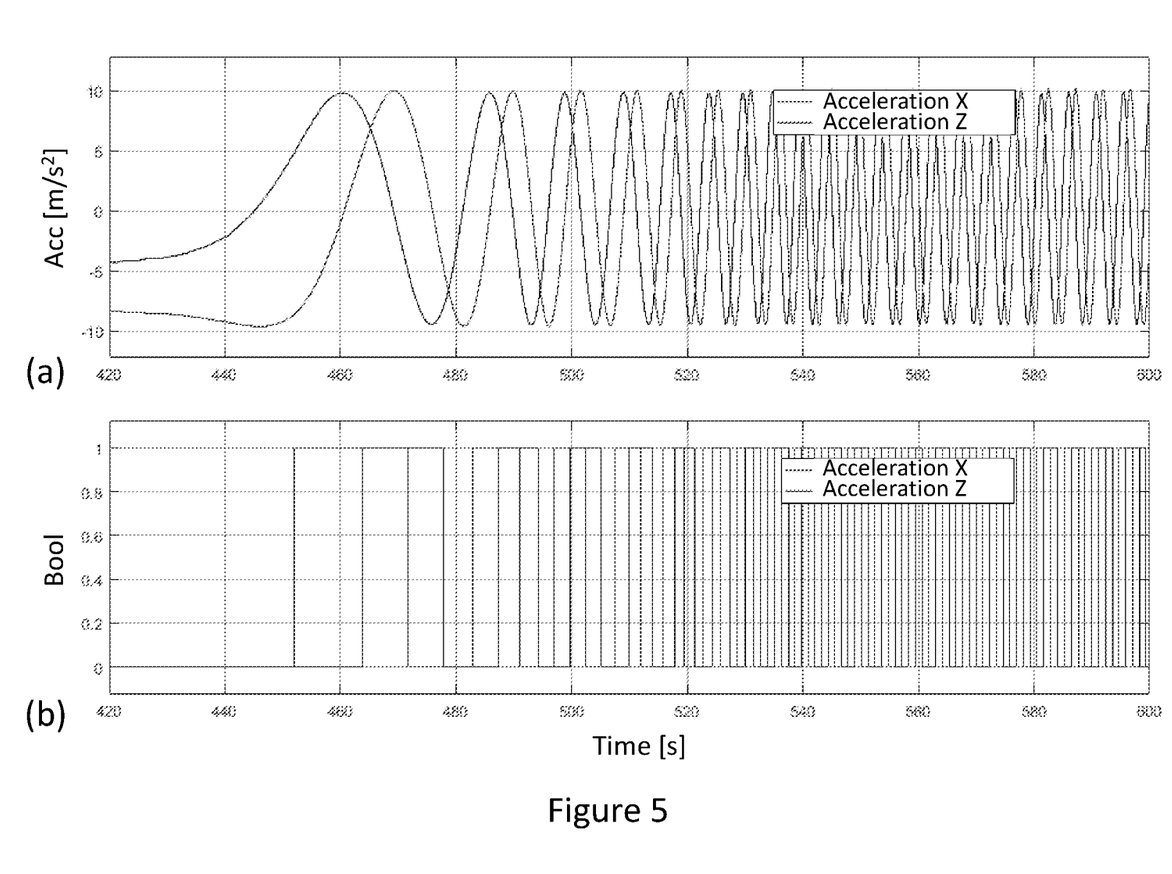
FIG. 5(a) shows a plot indicative of a centripetal-force compensated acceleration signal from an acceleration sensor of the control system of FIG. 1.
FIG. 5(b) shows a Boolean square wave signal of the acceleration signal of FIG. 5(a)

FIG. 5(*a*) illustrates a plot of the acceleration in each of the two directions radial to the rotor axis as the rotor blades 18 rotate, where the acceleration in each of the two radial directions is the acceleration signal in the respective directions received from the accelerometer 24 and compensated for centripetal force. As the radial directions are perpendicular to each other, it is seen that the two signals are 90 degrees out of phase. Furthermore, each signal is substantially sinusoidal, with an amplitude approximately equal to 1 g, where a period of the sinusoidal signal corresponds to one full rotation of the wind turbine rotor. As the rotation speed of the rotor increases, the period of the sinusoidal signals decreases, i.e. the signal frequency increases.

The controller 26 may convert the sinusoidal signals shown in FIG. 5(*a*) to Boolean signals. In particular, this conversion may be performed with reference to a +/−0.5 g threshold: the Boolean signal may be set to true (one) when the sinusoidal signal exceeds 0.5 g, and false (zero) when the sinusoidal signal falls below −0.5 g. FIG. 5(*b*) shows the Boolean signals corresponding to the respective sinusoidal signals of FIG. 5(*a*). This Boolean approach yields very noise-resistant square-wave signals that can then be used to determine an estimated rotor speed.

Figure 6:
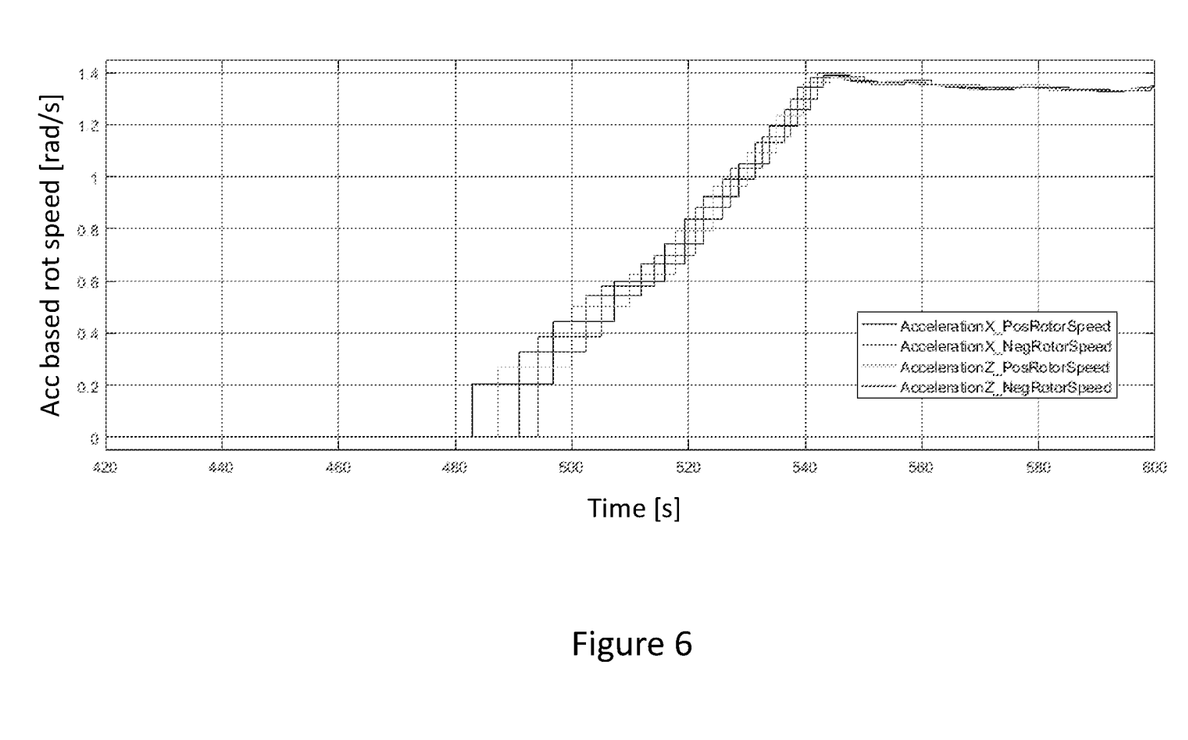
FIG. 6 shows a plot of estimated rotor speed signals of the wind turbine of FIG. 1 based on the Boolean square wave signal of FIG. 5(b); and, FIG. 7(a) shows a plot comparing estimated rotor speed from the signal of FIG. 6 against estimated rotor speed based on an angular velocity signal from an angular velocity sensor of the control system of FIG. 1.

The controller 26 determines the positive and negative period times for each of the two square-wave signals. These period times may then be used to estimate hub rotor speed. In particular, this provides four average hub rotor speed signals for each full revolution of the hub 16, i.e. one corresponding to each of the positive and negative portions for each of the two square wave signals. Each of these four portions are extrapolated to represent average rotor speed over one full rotation of the hub 16. This is illustrated in FIG. 6, which shows the average rotor speed over one full rotation of the hub 16 for each of the four signal portions. In particular, the horizontal parts of each plot are the average rotor speeds over successive full rotations of the rotor hub 16. Each of the four average hub rotor speed signals are 90 degrees out of phase, as is apparent from FIGS. 3(b) and 4. The frequency content of the gravity-driven sinusoidal acceleration signals is therefore used to determine average rotor speed over one full rotation of the rotor hub 16.

While this estimated rotor speed based on the acceleration sensor data is very noise resistant, and is relatively accurate over a full rotation of the rotor hub 16 (i.e. relatively low frequency content), this estimation may not have as good dynamic accuracy as the estimated rotor speed based on the gyroscope signal. A combination of these first and second estimated rotor speeds—i.e. a combination of the estimated rotor speeds based on the respective gyroscope and accelerometer signals—can provide a more accurate determination of wind turbine rotor speed than either of the first or second estimations alone.

The controller 26 combines the first and second estimated rotor speeds by applying a compensation or correction value based on the second estimated rotor speed to the first estimated rotor speed. This is in order to ensure zero mean error on the output rotor speed signal. In particular, at step 36 the controller 26 determines the correction value based on a difference between the first and second estimated rotor rotational speeds. To do this, the controller 26 averages the (first) estimated rotor speed based on the gyroscope signal over the same time intervals that the acceleration-based rotor rotational speed signals represent, and then calculates the difference between these two signals to determine the error in the gyroscope-based estimated rotor rotational speed.

Figure 7:
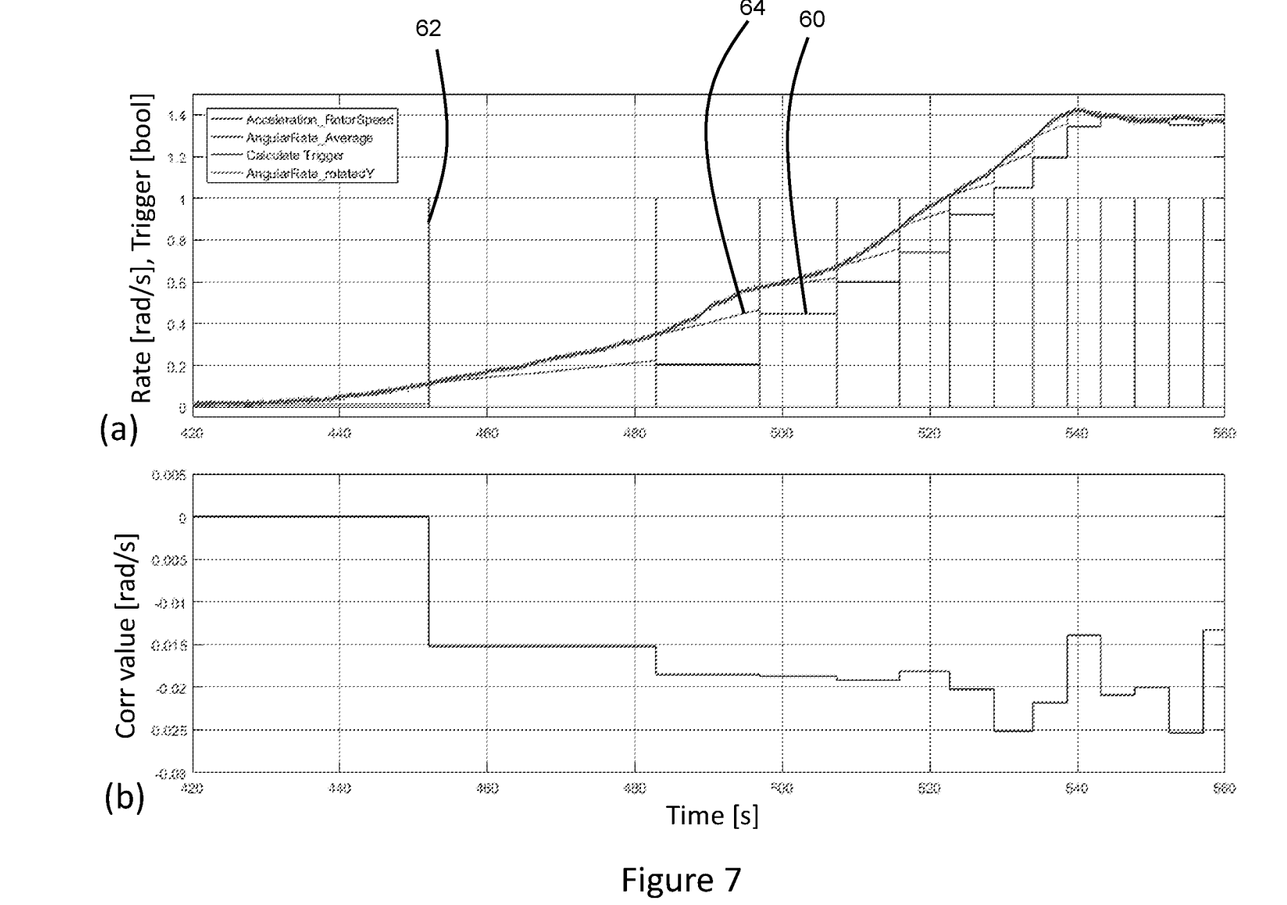

FIG. 7(a) illustrates an example of how the correction value is calculated, in particular for the positive time period estimates for the X acceleration signal. FIG. 7(a) shows one of the acceleration-based estimated rotor speeds 60 from FIG. 6, and a trigger point 62 at each full rotation of the rotor hub 16. The average gyroscope-based rotor speed signal 64 is then indicated over each full rotation of the rotor hub 16, i.e. between successive trigger points 62. The correction value over a full rotation is determined to be the difference between the acceleration-based estimated rotor speed 60 and the gyroscope-based rotor speed 64 at each trigger point 62. FIG. 7(b) illustrates this correction value, which is taken to be constant over each full rotation of the rotor hub 16, and changes at each trigger point 62.

At step 38 of the method 30, the controller 26 applies the correction value to the first estimated rotational speed—i.e. the gyroscope-based rotational speed—to determine the rotor speed of the wind turbine 10. This ensures that there is no DC error in the determined hub rotor speed while retaining the full dynamic response of the gyroscope-based signal. The particular way in which the acceleration-based rotor speed is used to compensate the gyroscope-based rotor speed may vary as desired. For instance, the correction value illustrated in FIG. 7(b) may be averaged over a number of rotations of the hub 16, e.g. four full revolutions, or a number of measurement samples, and then this averaged value may be applied as a correction to the gyroscope-based rotor speed at each time step. By averaging the correction value over a number of rotations, the acceleration-based estimated rotor speed's relatively less good dynamic response does not result in errors being introduced into the determined rotor speed. Also, factors that influence rotor speed measurements, such as wind speed, temperature, etc., may be regarded as not changing significantly over shorter periods such as one full rotation, and so corrections may not be required to take into account changes over such a shorter period. This 'hub-based' solution therefore provides an accurate, verifiable rotor speed measurement that does not rely on communication with the nacelle 14.

The validity of the rotor speed signal may be monitored. This can involve a number of different methods. For instance, faults in the gyroscope and acceleration sensor measurements may be detected and isolated. Also, it may be verified that the two measurement concepts agree within an acceptable margin. The control system 20 may be configured to shut down the wind turbine 10 in different ways depending on which type of fault is identified and the rotor speed signal.

In one example, communication between the accelerometer 24 and the controller 26 is monitored. In particular, it may be confirmed that new acceleration data is being provided by the accelerometer 24 to the controller 26, and that the data associated with the accelerometer 24 changes value over time, thereby confirming that proof masses of the accelerometer 24 are not stuck.

It may also be confirmed that new angular velocity data is being provided by the gyroscope 22 to the controller 26. The gyroscope 22 may have a continuous built-in self-test that verifies correct operation of the device. Individual axes of the gyroscope 22 may be monitored for changes in value over time to ensure that the mechanical structures are not stuck.

Also, correct configuration of the accelerometer 24 may be proven by monitoring the magnitude of the resulting accelerometer vector and verifying that it is close to 1 g, for instance by means of a cumulative sum (CuSum) algorithm. This may be determined with reference to a threshold, but the threshold may provide robustness to the overall control system as it may be breached every once in a while, without causing the wind turbine 10 to be stopped. Instead, the acceleration vector length may need to breach the threshold continuously for a certain time period before an error is detected, thereby ensuring that a fault is not triggered by oscillations of the tower top.

As an example, the Euclidean length of the acceleration vector—spanned by the acceleration measurements in the three measurement directions—may be calculated. The centripetal force compensated acceleration signals in the X and Z (radial) directions (as described above) may be used, as well as the median filtered acceleration in the Y (axial) direction (also as described above). The acceleration vector length may then be given by $$Acc_{length} = \sqrt{AccX^2_{Compensated} + AccY^2_{MedFilt} + AccZ^2_{Compensated}}$$

The trigger threshold or tolerance may then be defined as $$\text{abs}(Const\ g - \text{abs}(Acc_{length})) > \text{tolerance}$$

Furthermore, the determined correction value may be monitored to ensure that it does not become too large. While the angular rate obtained from the gyroscope 22 is expected to have a bias and to drift to some extent—such that some degree of inaccuracy is expected—there is a limit to this bias and offset. There are therefore upper and lower bounds inside of which the correction value is expected to remain. If these bounds are exceeded, then this may indicate a fault in the operation or configuration of the gyroscope 22.

If one or more faults, such as the ones outlined above, are detected, then an error signal may be generated. The action that is taken may depend on the particular fault or faults that are detected. For instance, if a fault is detected in the accelerometer signals then the correction value may no longer be determined, but the control system 20 may still use the rotor speed determined based on the gyroscope signals in order to control the wind turbine 10, e.g. to perform controlled shutdowns when the control system 20 is a safety controller. However, if a fault is detected in the gyroscope signal, then the wind turbine 10 may be shut down without using the rotor speed determination regardless of whether the accelerometer signals are faulty or not.

Many modifications may be made to the described examples without departing from the scope of the invention as defined in the appended claims.

The method of the invention may be implemented on any suitable computing device, for instance by one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the method, and the processor(s) may execute the stored instructions to perform the method.

The invention claimed is:

1. A method of determining a rotor speed of a wind turbine, the method comprising:
   receiving angular velocity sensor data, from an angular velocity sensor located in a rotor hub of the wind turbine, indicative of an angular velocity of the rotor hub across a time interval;
   receiving acceleration sensor data, from an acceleration sensor located in the rotor hub, indicative of an acceleration of the rotor hub in at least one radial direction relative to an axis of rotation of the rotor hub across the time interval;
   determining a first estimated rotational speed of the rotor hub across the time interval based on the received angular velocity sensor data;
   determining a second estimated rotational speed of the rotor hub across the time interval based on the received acceleration sensor data;
   determining a correction value based on a difference between a mean value of the first estimated rotational speed for the time interval and a mean value of the second estimated rotational speed for the time interval;
   applying the correction value to the first estimated rotational speed to determine the rotor speed of the wind turbine; and
   controlling the wind turbine based on the determined rotor speed.

2. The method according to claim 1, wherein determining the first and second estimated rotational speeds comprises transforming the received angular velocity sensor data and the received acceleration sensor data into a rotational coordinate system that rotates with the rotor hub.

3. The method according to claim 1, wherein applying the correction value to the first estimated rotational speed to determine the rotor speed of the wind turbine occurs at a timestep, and wherein the method further comprises: retrieving a rotor speed determined at a previous timestep, and wherein determining the second estimated rotational speed comprises applying an offset to the acceleration of the rotor hub in the at least one radial direction to compensate for a centripetal force contribution included in the received acceleration sensor data, the offset being determined based on the determined rotor speed from the previous timestep.

4. The method according to claim 1, wherein the acceleration of the rotor hub in the at least one radial direction perpendicular to the axis of rotation of the rotor hub is a sinusoidal signal, and wherein the second estimated rotational speed is determined based on a determined period of the sinusoidal signal.

5. The method according to claim 4, wherein determining the second estimated rotational speed comprises converting the sinusoidal signal to a logic signal, and basing the determination of the second estimated rotational speed on a determined period of the logic signal.

6. The method according to claim 5, wherein converting to the logic signal comprises assigning a true value when the sinusoidal signal moves above a first threshold value and assigning a false value when the sinusoidal signal moves below a second threshold value.

7. The method of claim 6, wherein the first threshold value is +0.5 g and the second threshold value is −0.5 g.

8. The method according to claim 1, wherein determining the correction value comprises determining a representative value of the correction value over the time interval, and wherein applying the correction value comprises applying the representative value of the correction value to the first estimated rotational speed to determine the rotor speed of the wind turbine, wherein the representative value is a mean value.

9. The method of claim 8, wherein; and the time interval corresponds to a time taken for the rotor hub to complete a prescribed number of full rotations.

10. The method according to claim 1, wherein the at least one radial direction includes two different radial directions relative to the axis of rotation of the rotor hub, the two different radial directions being perpendicular to each another.

11. The method according to claim 1, wherein the correction value is determined at a prescribed trigger point, wherein the prescribed trigger point is upon each completed full rotation of the rotor hub.

12. The method according to claim 1, further comprising generating an error signal if the determined correction value is greater than a prescribed threshold correction value.

13. The method according to claim 1, wherein the angular velocity sensor and the acceleration sensor are part of a single sensor unit located in the rotor hub, wherein the angular velocity sensor is a multi-axis gyroscope and/or wherein the acceleration sensor is an accelerometer.

14. The method according to claim 1, wherein the angular velocity sensor and the acceleration sensor are embedded in a safety control system of the rotor hub.

15. The method of claim 1, wherein; the time interval corresponds to a time taken for the rotor hub to complete a prescribed number of full rotations.

16. The method according to claim 1, wherein controlling the wind turbine based on the determined rotor speed comprises performing a controlled shutdown of the wind turbine based on the determined rotor speed.

17. A control system for a wind turbine, the system comprising an angular velocity sensor and an acceleration sensor each located in a rotor hub of the wind turbine, and the system comprising a computer processor configured to:
   receive angular velocity sensor data, from the angular velocity sensor, indicative of an angular velocity of the rotor hub across a time interval;

receive acceleration sensor data, from the acceleration sensor, indicative of an acceleration of the rotor hub across the time interval in at least one radial direction relative to an axis of rotation of the rotor hub;

determine a first estimated rotational speed of the rotor hub across the time interval based on the received angular velocity sensor data;

determine a second estimated rotational speed of the rotor hub across the time interval based on the received acceleration sensor data;

determine a correction value based on a difference between a mean value of the first estimated rotational speed for the time interval and a mean value of the second estimated rotational speed for the time interval;

apply the correction value to the first estimated rotational speed to determine a rotor speed of the wind turbine, and controlling the wind turbine based on the determined rotor speed.

18. The control system according to claim 17, wherein controlling the wind turbine based on the determined rotor speed comprises performing a controlled shutdown of the wind turbine based on the determined rotor speed.

19. A wind turbine, comprising:

a tower;

a nacelle disposed on the tower;

a rotor extending from the nacelle and having a rotor hub with plurality of blades extending therefrom; and a control system, comprising:

an angular velocity sensor;

an acceleration sensor each located in the rotor hub of the wind turbine; and a computer processor configured to:

receive angular velocity sensor data, from the angular velocity sensor, indicative of an angular velocity of the rotor hub across a time interval;

receive acceleration sensor data, from the acceleration sensor, indicative of an acceleration of the rotor hub across the time interval in at least one radial direction relative to an axis of rotation of the rotor hub;

determine a first estimated rotational speed of the rotor hub based on the received angular velocity sensor data;

determine a second estimated rotational speed of the rotor hub based on the received acceleration sensor data;

determining a correction value based on a difference between a mean value of the first estimated rotational speed for the time interval and a mean value of the second estimated rotational speed for the time interval, wherein determining the correction value comprises determining a representative value of the correction value over the time interval;

apply the correction value to the first estimated rotational speed to determine a rotor speed of the wind turbine, wherein applying the correction value comprises applying the representative value of the correction value to the first estimated rotational speed to determine the rotor speed of the wind turbine, wherein the representative value is a mean value; and control the wind turbine based on the determined rotor speed.

* * * * *